United States Patent
Braia et al.

(10) Patent No.: US 6,289,344 B1
(45) Date of Patent: *Sep. 11, 2001

(54) CONTEXT-SENSITIVE AUTHORIZATION IN AN RDBMS

(75) Inventors: Kimberly Anne Braia, San Jose; Curt Lee Cotner, Gilroy; Nelson Mendonca Mattos, San Jose; Randy M. Nakagawa, San Jose; Roy Lorenzo Smith, San Jose; Jerome Quan Wong, Mountain View, all of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,652

(22) Filed: May 11, 1998

(51) Int. Cl.[7] .................................................. G06F 17/30
(52) U.S. Cl. ..................... 707/9; 707/6; 707/10; 707/3; 713/200; 713/201
(58) Field of Search .................. 707/100, 2, 3, 707/9, 201, 6; 709/225; 713/201, 202, 200; 340/825.34; 380/25

(56) References Cited

U.S. PATENT DOCUMENTS

| | | | |
|---|---|---|---|
| 4,817,140 | 3/1989 | Chandra et al. | 380/4 |
| 4,918,653 | 4/1990 | Johri et al. | 364/900 |
| 5,214,700 | 5/1993 | Pinkas et al. | 380/25 |
| 5,317,729 | 5/1994 | Mukherjee et al. | 395/600 |
| 5,323,146 | 6/1994 | Glaschick | 340/825.34 |
| 5,410,693 | 4/1995 | Yu et al. | 395/600 |
| 5,499,359 | 3/1996 | Vijaykumar | 395/600 |
| 5,502,766 * | 3/1996 | Boebert et al. | 380/25 |
| 5,539,870 | 7/1996 | Conrad et al. | 395/155 |
| 5,603,025 | 2/1997 | Tabb et al. | 395/602 |
| 5,615,367 | 3/1997 | Bennett et al. | 395/613 |
| 5,619,657 | 4/1997 | Sudama et al. | 395/200.06 |
| 5,619,692 | 4/1997 | Malkemus et al. | 395/602 |
| 5,651,068 | 7/1997 | Klemba et al. | 380/25 |
| 5,659,728 | 8/1997 | Bhargava et al. | 395/602 |
| 5,701,453 * | 12/1997 | Maloney et al. | 707/201 |
| 5,881,225 * | 3/1999 | Worth | 713/200 |
| 5,937,159 * | 8/1999 | Meyers et al. | 713/201 |
| 6,006,228 * | 12/1999 | McCollum et al. | 707/9 |
| 6,012,067 * | 1/2000 | Sarkar | 707/103 |
| 6,101,607 * | 8/2000 | Bachand et al. | 713/201 |

FOREIGN PATENT DOCUMENTS 0 750 412 A2  12/1996  (EP) .

OTHER PUBLICATIONS

Tobbicke, Distributed File Systems: Focus on Andrew File System/Distributed File Service (AFS/DFS), IEEE, 1994, pp. 23–26.*
Majetic et al., "Authorization and Revocation in Object–Oriented Databases", IEEE, 1997, pp. 668–672.*
IBM Technical Disclosure Bulletin, vol. 31, No. 5, Oct. 1988, pp. 30–33.
IBM Technical Disclosure Bulletin, vol. 32, No. 10B, Mar. 1990, pp. 16–18.

* cited by examiner

Primary Examiner—Wayne Amsbury
Assistant Examiner—Thuy N. Pardo
(74) Attorney, Agent, or Firm—Janaki Komanduri; Ingrid Foerster (57) ABSTRACT

A method, apparatus, and article of manufacture for a computer implemented authorization system. A statement is to be executed by a computer to manipulate data in a database stored on a data storage device connected to the computer. Initially, an environment of the database from which the statement was invoked is identified. Additionally, a security option is identified. Then, authorization privileges for the statement are determined based on the identified environment and security option.

42 Claims, 10 Drawing Sheets

CONTEXT-SENSITIVE AUTHORIZATION IN AN RDBMS

BACKGROUND OF THE INVENTION

1. Field of the Invention

This invention relates in general to computer-implemented database systems, and, in particular, to context-sensitive authorization in an RDBMS.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

The trend toward object-oriented programming has led to a proliferation of user written software components (e.g., classes, methods, subroutines, etc.). These software components are the building blocks of larger application systems, in which a given software component may be used by many separate application programs. Often, the boundaries between one software component and another are not understood by the RDBMS because, instead of interacting directly with the RDBMS, the software components may use a generic interface, such as an Open Database Connectivity (ODBC) driver or Java Database Connectivity (JDBC) driver, to interact with the RDBMS. In this case, the RDBMS is only aware of the ODBC or JDBC driver that the software component uses to issue SQL requests.

Because the RDBMS is not aware of the software components, it is difficult to manage the RDBMS security issues associated with the application programs that are invoking the software components. For example, a given software component may need one set of RDBMS authorizations when it is invoked from application program A, and a different set of RDBMS authorizations when it is invoked from application program B. In conventional systems, there is no way to achieve this sort of authorization flexibility within the RDBMS, especially when the software component uses a generic interface like ODBC or JDBC.

There is a need in the art for context-sensitive authorization in the RDBMS.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented authorization system.

In accordance with the present invention, a statement is to be executed by a computer to manipulate data in a database stored on a data storage device connected to the computer. Initially, an environment of the database from which the statement was invoked is identified. Additionally, a security option is identified. Then, authorization privileges for the statement are determined based on the identified environment and security option.

An object of the invention is to provide context-sensitive authorization in a database. A further object of the invention is to provide context-sensitive authorization with definer, invoker, and binder security options in a trusted environment. Yet another object of the invention is to enable users to select authorization privileges in untrusted environments.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
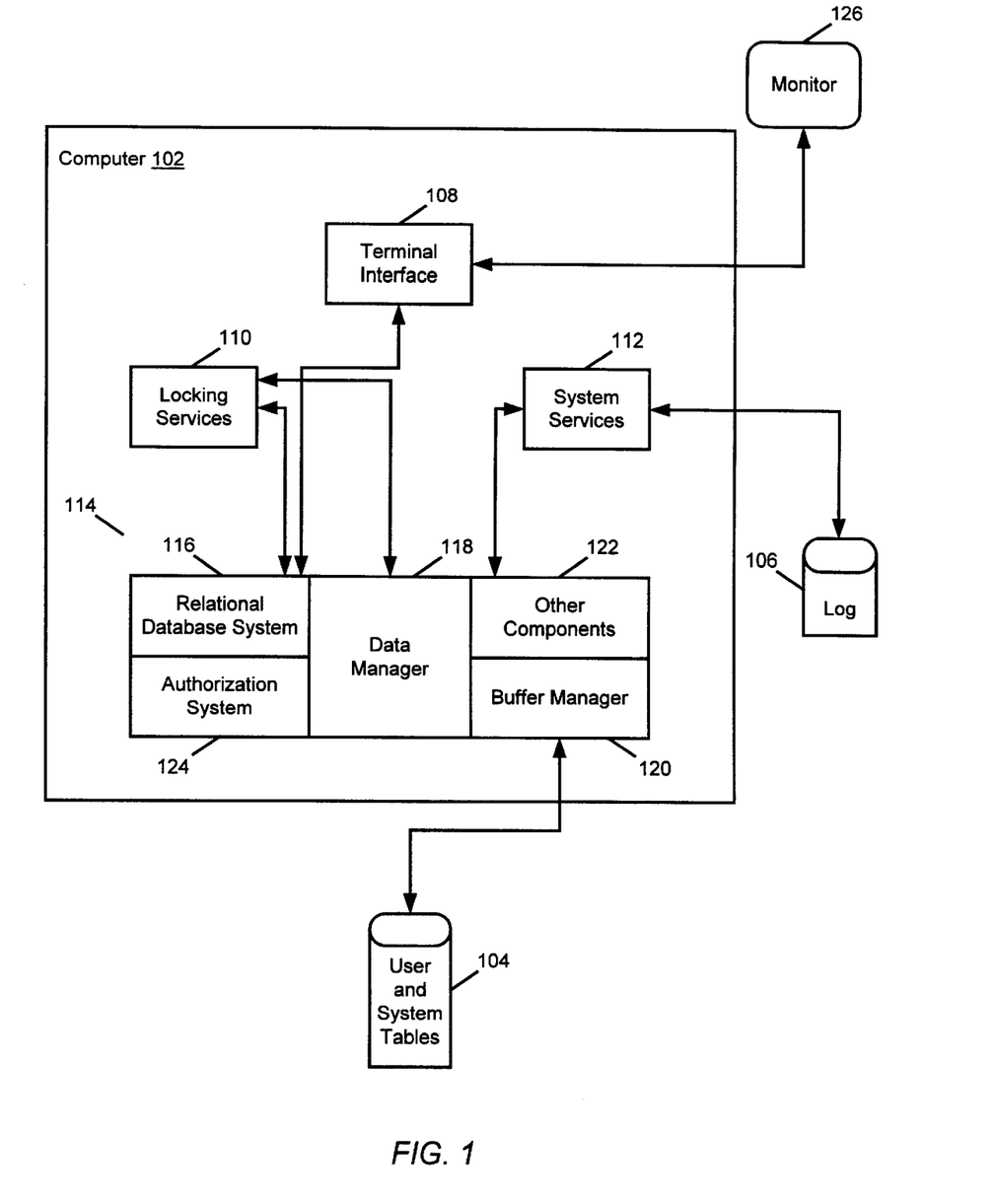
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

The definitions for SQL provide that the RDBMS software should respond to a particular query with a particular set of data given a specified database content, but the method that the RDBMS software uses to actually find the required information in the tables on the disk drives is left up to the RDBMS software. Typically, there will be more than one method that can be used by the RDBMS software to access the required data. The RDBMS software will optimize the method used to find the data requested in a query in order to minimize the computer time used and, therefore, the cost of performing the query.

In the preferred embodiment of the present invention, the RDBMS software comprises the DB2® product offered by IBM for the MVS® or OS/390® operating systems. Those skilled in the art will recognize, however, that the present invention has application to any RDBMS software, whether or not the RDBMS software uses SQL.

As illustrated in FIG. 1, the DB2® system for the MVS® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Authorization System 124, and other components 122 such as an SQL compiler/interpreter. These submodules support the functions of the SQL language, i.e. definition, access control, interpretation, compilation, database retrieval, and update of user and system data. The Authorization System 124 works in conjunction with the other submodules to rebalance partitioned data.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, cause the computer system 102 to perform the steps necessary to implement and/or use the present invention. Under control of an operating system, the RDBMS software, the SQL statements, and the instructions derived therefrom, may be loaded from the data storage devices 104 and 105 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Context-Sensitive Authorization in an RDBMS

The present invention provides an authorization system 124 that invokes unique authorization privileges (i.e., rules) depending on the context in which a given software component is invoked. The authorization privileges are used to determine whether a SQL statement issued by a software component should be executed. The SQL statement is a request to the RDBMS to manipulate (e.g., read, insert, or update) data. If the request is authorized, the authorization system 124 executes the SQL statement issued by the software component, otherwise, the authorization system 124 provides an indication that the SQL statement cannot be executed (e.g., an error message).

The authorization system 124 determines authorization privileges for each SQL statement issued by a software component. The authorization system 124 identifies the authorization privileges for each SQL statement to be executed based on whether the software component issuing the SQL statement is invoked within a trusted or untrusted environment. Software components are invoked within a trusted environment (i.e., from environments controlled by the RDBMS) when they are invoked by "secure" components (e.g., stored procedures and user-defined functions) that run internally within the RDBMS or externally in an environment deemed secure by the RDBMS. When a software component is invoked in a trusted environment, the RDBMS is able to make authorization decisions based on the privileges associated with the RDBMS secure component that invoked the software component in the secure environment.

Software components are invoked from an untrusted environment (i.e., from environments not controlled by the RDBMS) when they are invoked by other software components known as "unsecure" components because they are invoked directly by a software component, rather than through the RDBMS. The authorization system 124 identifies different privileges for trusted and untrusted environments.

Figure 2:
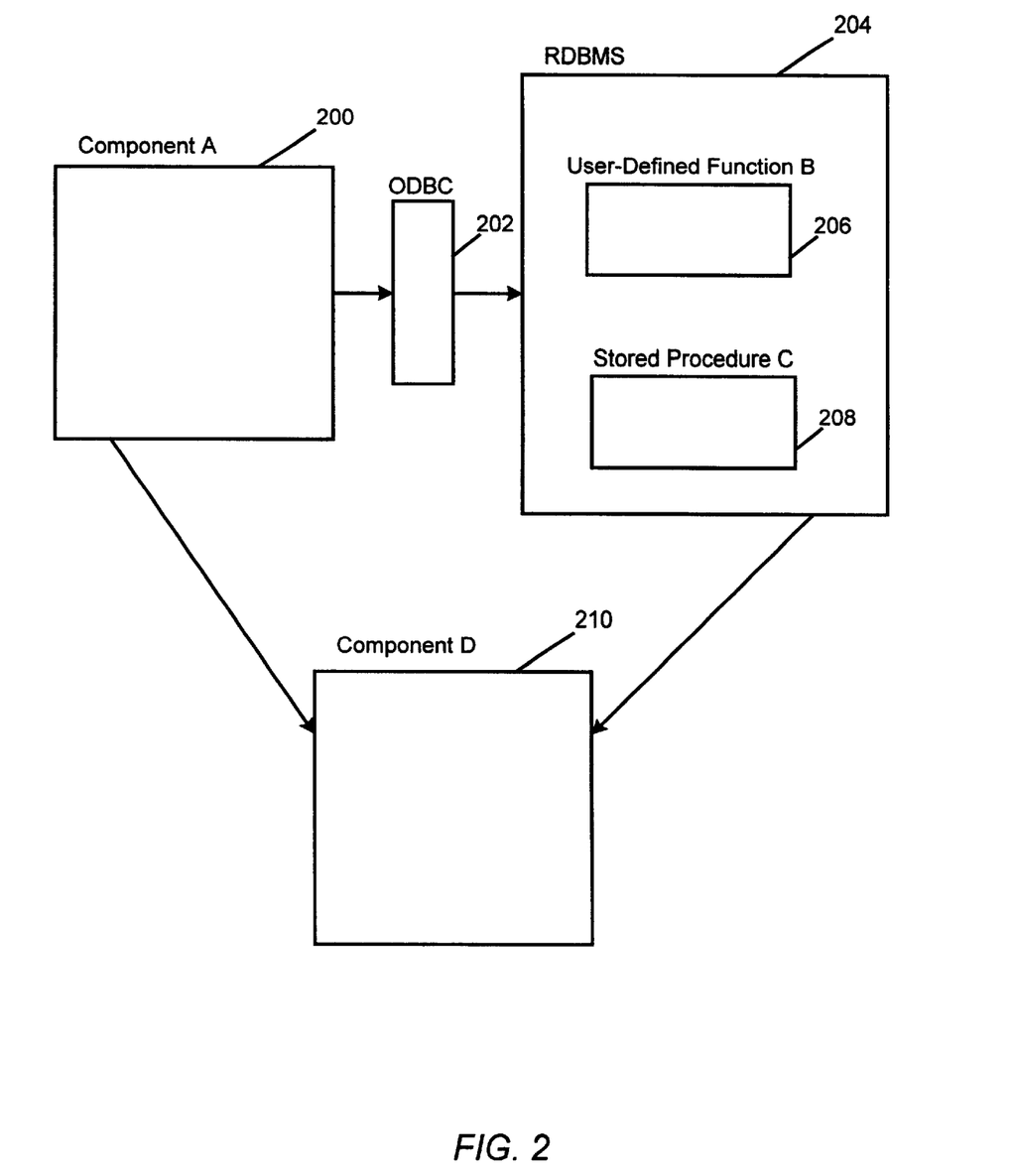
FIG. 2 is a block diagram illustrating trusted and untrusted environments.

FIG. 2 is a block diagram illustrating trusted and untrusted environments. Component A 200 accesses the RDBMS 204 via a generic SQL interface, such as an ODBC driver 202. User-Defined Function B 206 and Stored Procedure C 208 are within the RDBMS environment 204, which is a trusted environment. Component D 210 is outside the RDBMS environment 204, which is an untrusted environment. If ComponerLt A200 invokes User-Defined Function B 206 or Stored Procedure C 208, which in turn invoke Component D 210, the authorization system 124 recognizes that Component D 210 is being invoked from a trusted environment. If Component A 200 invokes Component D 210 directly, the authorization system recognizes that Component D 210 is being invoked from an untrusted environment.

In particular, a software component or a generic interface (i.e., if the software component uses a generic interface, such as ODBC or JDBC) is bound to the RDBMS with a security option. For trusted environments, the authorization system 124 recognizes multiple security options, including the "context-sensitive definer", "context-sensitive invoker", and "context-sensitive binder" security options of the present invention. For the context-sensitive definer security option, the authorization system 124 identifies authorization privileges based on the authorization identifier of the person who created the user-defined finction or stored procedure that invokes a software component. For the context-sensitive invoker security option, the authorization system 124 identifies authorization privileges based on the authorization identifier associated with the SQL statement that invoked the user-defined function or stored procedure that invoked the software component. For the context-sensitive binder security option, the authorization system 124 identifies authorization privileges based on the privileges of the binder who bound the application program containing the SQL statement that invoked the user-defined function or stored procedure that invoked the software component. For untrusted environments, the authorization system 124 enables a user to specify whether authorization privileges are to be based on the privileges of an end-user (i.e., the "context-insensitive end-user security option") or the privileges of the binder who bound the software component being invoked, or if the software component has a driver, the privileges of the binder who bound the driver to the RDBMS (i.e., the "context-insensitive binder security option").

In a conventional RDBMS, authorization privileges are determined based on whether a SQL statement is static or dynamic. With static SQL, the SQL request is known to the RDBMS when an application program containing the SQL statements is bound to the RDBMS. Generic SQL interfaces, such as JDBC or ODBC, are not currently able to generate static SQL statements. Static SQL is performed using the authorization privileges of the binder that bound the application program to the RDBMS. The binder is, for example, an application program author or an administrative person with special database authorization privileges. Once the application program is bound to the RDBMS, end-users can be given explicit authority to run the bound application program. This entitles the end-user to run the application program, with the SQL statements in the application program being performed with the authorization privileges of the binder who bound the application program, but the end-user is not given the authority to manipulate the RDBMS tables accessed by the application program. In this way, access to the underlying RDBMS tables can be controlled by funneling all data access through a specific set of application programs with known behavior.

With dynamic SQL, the SQL request is built during program execution and is not known when the application program is bound to the RDBMS. JDBC and ODBC interfaces use dynamic SQL to access tables managed by the RDBMS. Conventional RDBMS products typically offer two ways to control dynamic SQL authorization. In some conventional RDBMS products, dynamic SQL is performed using the authorization privileges of the end-user, and, in other conventional RDBMS products, dynamic SQL is performed using the authorization privileges of the binder that bound the dynamic SQL application program to the RDBMS.

The most common approach for dynamic SQL is to use the authorization privileges of the end-user. When authorization is based on the authorization privileges of the end-user, end-users are given update authorization privileges (i.e., authorization to update data) for the tables accessed by the application program. In general, using the authorization privileges of the end-user does not provide acceptable security in application programs because end-users can update data without using the application program. In particular, a database administrator may wish to provide end-users with access to tables of a database, but also desire to have control over how the RDBMS data (i.e., data in the database) is accessed and manipulated. If the end-user has table authorization privileges (i.e., authorization to modify tables), the end-user can update the RDBMS data with any database tools (e.g., shrink-wrapped SQL tools), rather than using the application programs provided by the database administrator to access the data. This results in the database administrator having little or no control over how the RDBMS data is accessed or manipulated.

Some conventional RDBMS products that run dynamic SQL use the authorization privileges of the binder who bound the dynamic SQL application program to the RDBMS. Using the authorization privileges of the binder provides some security control over application programs that contain embedded dynamic SQL, because the embedded dynamic SQL will be executed based on the binder's authorization privileges. However, using the binder's authorization privileges is of little use for application programs that invoke a generic dynamic SQL interface, such as ODBC or JDBC because, when a generic SQL interface is invoked, the RDBMS is aware of only the ODBC or JDBC driver, and not the application program that invoked the interface. In particular, if the application program uses a generic interface, such as an ODBC or JDBC driver, conventional RDMBS products use the authorization privileges of the binder who bound the ODBC or JDBC driver to the RDBMS. Using the authorization privileges of the binder applies to all software components that use ODBC or JDBC rather than a specific software component. This is usually not sufficiently granular to provide adequate security control over a large number of software components. In addition, most of the shrink-wrapped SQL tools use ODBC or JDBC, so the shrink-wrapped tools can be easily directed to use the ODBC or JDBC driver that was bound.

Unlike conventional systems, the authorization system 124 identifies authorization privileges based on the environment (i.e., trusted or untrusted) in which a component is invoked and based on the security option used to bind the software component or its generic interface to the RDBMS.

Software components that are invoked from environments controlled by the RDBMS (i.e., from trusted environments) include software components that are invoked by stored procedures and user-defined finctions (i.e., "secure" components) that run internally within the RDBMS or externally in a secure environment. When a software component is invoked within the RDBMS context, the authorization system 124 can make authorization decisions based on the authorization privileges associated with the RDBMS secure components that invoked the software component in the trusted environment. The present invention defines five modes for authorization: the context-insensitive end-user security option, the context-insensitive binder security option, the context-sensitive definer security option, the context-sensitive invoker security option, and the context-sensitive binder security option.

In the first authorization mode (i.e., the context-insensitive end-user security option), the authorization system 124 performs a SQL statement issued by a software component using the end-user's authorization privileges. The authorization rules are the same for both trusted and untrusted environments because this mode is context-insensitive.

In the second authorization mode (i.e., the context-insensitive binder security option), the authorization system 124 performs a SQL statement issued by a software component using the authorization privileges of the binder who bound the software component to the RDBMS. If the software component uses ODBC or JDBC, the authorization privileges of the binder who bound the ODBC or JDBC driver are used. The authorization rules are the same for both trusted and untrusted environments because this mode is context-insensitive.

In the third authorization mode (i.e., context-sensitive definer security option), the authorization system 124 performs a SQL statement issued by a software component using different authorization privileges based on the DEFINER of the stored procedure or user-defined function that invoked the software component. In trusted environments. the authorization system 124 performs a SQL statement issued by the software component using the authorization privileges of the creator that created the stored procedure or user defined function that invoked the software component. That is, the authorization system 124 identifies authorization privileges based on the authorization identifier of the person who created the user-defined function or stored procedure that invokes a software component. In untrusted environments, the authorization system 124 enables a user to specify whether authorization privileges are to be based on the privileges of an end-user or the privileges of the binder who bound the software component being invoked to the RDBMS. If the software component uses an ODBC or JDBC driver, the privileges of the person who bound the ODBC or JDBC driver to the RDBMS are used.

In the fourth authorization mode, (i.e., the context-sensitive invoker security option), the authorization system 124 performs a SQL statement issued by a software component using different authorization privileges based on an INVOKER of the software component. In trusted environments, the authorization system 124 performs a SQL statement using the authorization privileges associated with the SQL statement that invoked the user-defined function or stored procedure that invoked the software component.

RDBMS vendors have many ways to establish access in this fashion. For example, the end-user's authorization ID may be used when the end-user directly accesses a stored procedure or user-defined finction to invoke a software component.

Additionally, the software component invocation request may be nested, for example, a first SQL Statement in PROCEDURE1 calls PROCEDURE2, which in turn contains a second SQL statement that invokes the software component in question. If both PROCEDURE1 and PROCEDURE2 are bound to the RDBMS with the context-sensitive invoker security option, the authorization privileges associated with the first SQL statement are used to determine whether SQL statements in the software component can be executed. If PROCEDURE1 is bound to the RDBMS with the context-sensitive definer security option and PROCEDURE2 is bound to the RDBMS with the contextsensitive invoker security option, the authorization privileges associated with the authorization ID of the creator of the last invoked stored procedure or user-defined function are used to determine whether SQL statements in the software component can be executed.

In untrusted environments, the authorization system 124 enables a user to specify whether authorization privileges are to be based on the privileges of an end-user or the privileges of the binder who bound the software component being invoked to the RDBMS. If the software component uses an ODBC or JDBC driver, the privileges of the person who bound the ODBC or JDBC driver to the RDBMS are used.

In the fifth authorization mode, the authorization system 124 performs a SQL statement issued by a software component using different authorization privileges based on the authorization privileges of the BINDER of the application program containing the SQL statement that invoked the stored procedure or user-defined function that invoked the software component. In trusted environments, the authorization system 124 performs a SQL statement issued by the software component using the authorization privileges of the binder who bound the application program containing the SQL statement that invoked the user-defined function or stored procedure that invoked the software component. In untrusted environments, the authorization system 124 enables a user to specify whether authorization privileges are to be based on the privileges of an end-user or the privileges of the binder who bound the software component being invoked to the RDBMS. If the software component uses an ODBC or JDBC driver, the privileges of the person who bound the ODBC or JDBC driver to the RDBMS are used.

Figure 3:
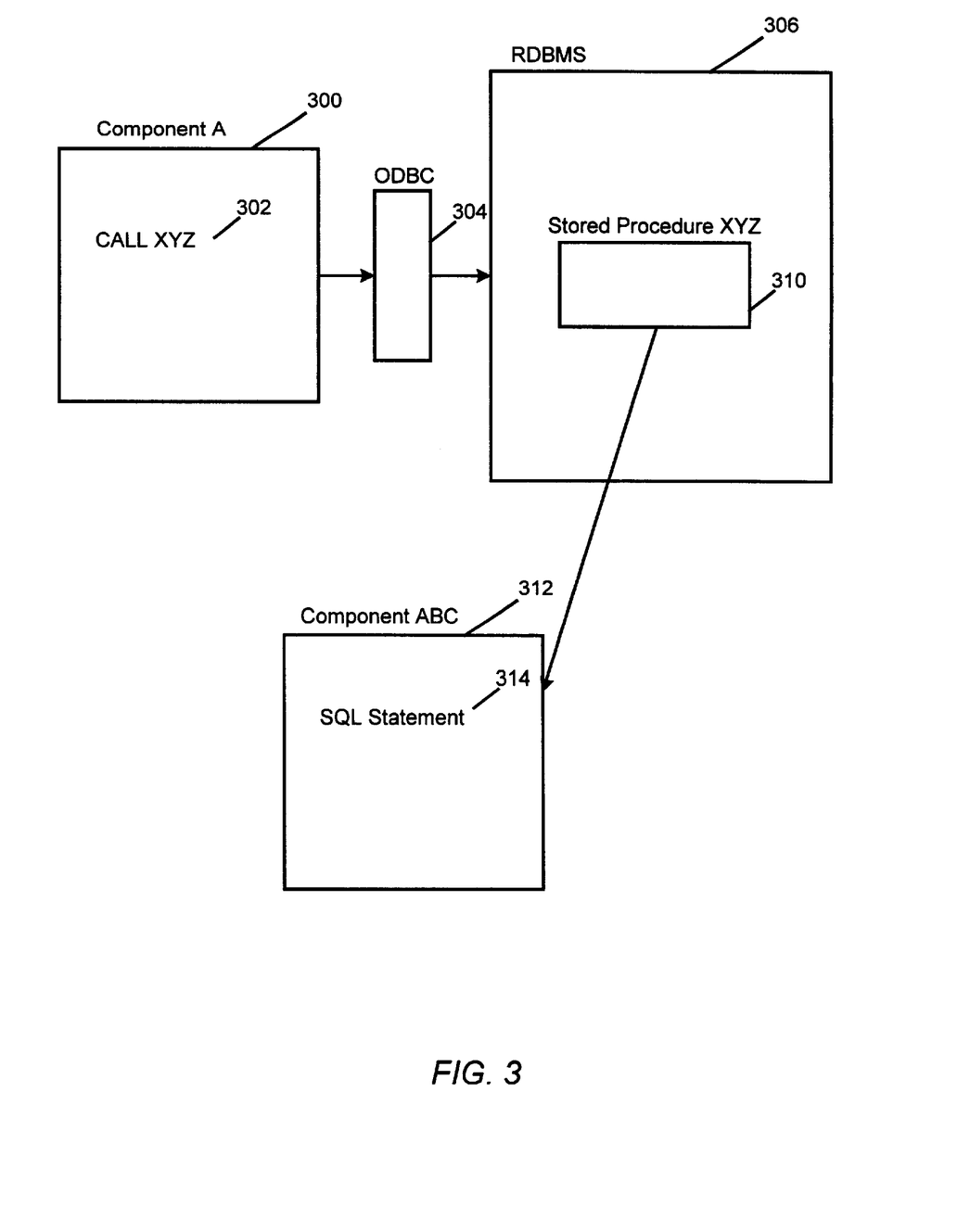
FIG. 3 is a block diagram illustrating an example using the present invention.

FIG. 3 is a block diagram illustrating an example using the present invention. Component A 300 accesses the RDBMS 306 via an ODBC driver 304. Component A 300 contains SQL statement 302, which invokes Stored Procedure XYZ 310. In turn, Stored Procedure XYZ 310 invokes Component ABC 312. Because Component ABC 312 is invoked by a stored procedure, it is invoked in a trusted environment.

If the context-insensitive end-user security option were set, the authorization system 124 would perform the SQL statement 314 using the end-user's authorization privileges. If the context-insensitive binder security option were set, the authorization system 124 would perform the SQL statement 314 using the privileges associated with the authorization identifier of the person who bound Component ABC 312 to the RDBMS 306. If Component ABC 312 accessed the RDBMS 306 using a generic interface, the authorization system 124 would use the privileges associated with the authorization identifier of the person who bound the generic interface to the RDBMS.

If the context-sensitive definer security option were set, the authorization system 124 would perform the SQL statement 314 using the privileges associated with the authorization identifier of the creator of Stored Procedure XYZ 310. If the context-sensitive invoker security option were set, the authorization system 124 would perform the SQL statement 314 using the authorization identifier associated with the SQL statement 302 that invoked the Stored Procedure XYZ 310. If the context-sensitive binder security option were set, the authorization system 124 would perform the SQL statement 314 using the privileges associated with the authorization identifier of the person who bound the ODBC driver 304 to the RDBMS 306. (If Component A 300 accessed the RDBMS 306 directly, the authorization privileges of the person who bound Component A 300 to the RDBMS 306 would be used.)

Figure 4:
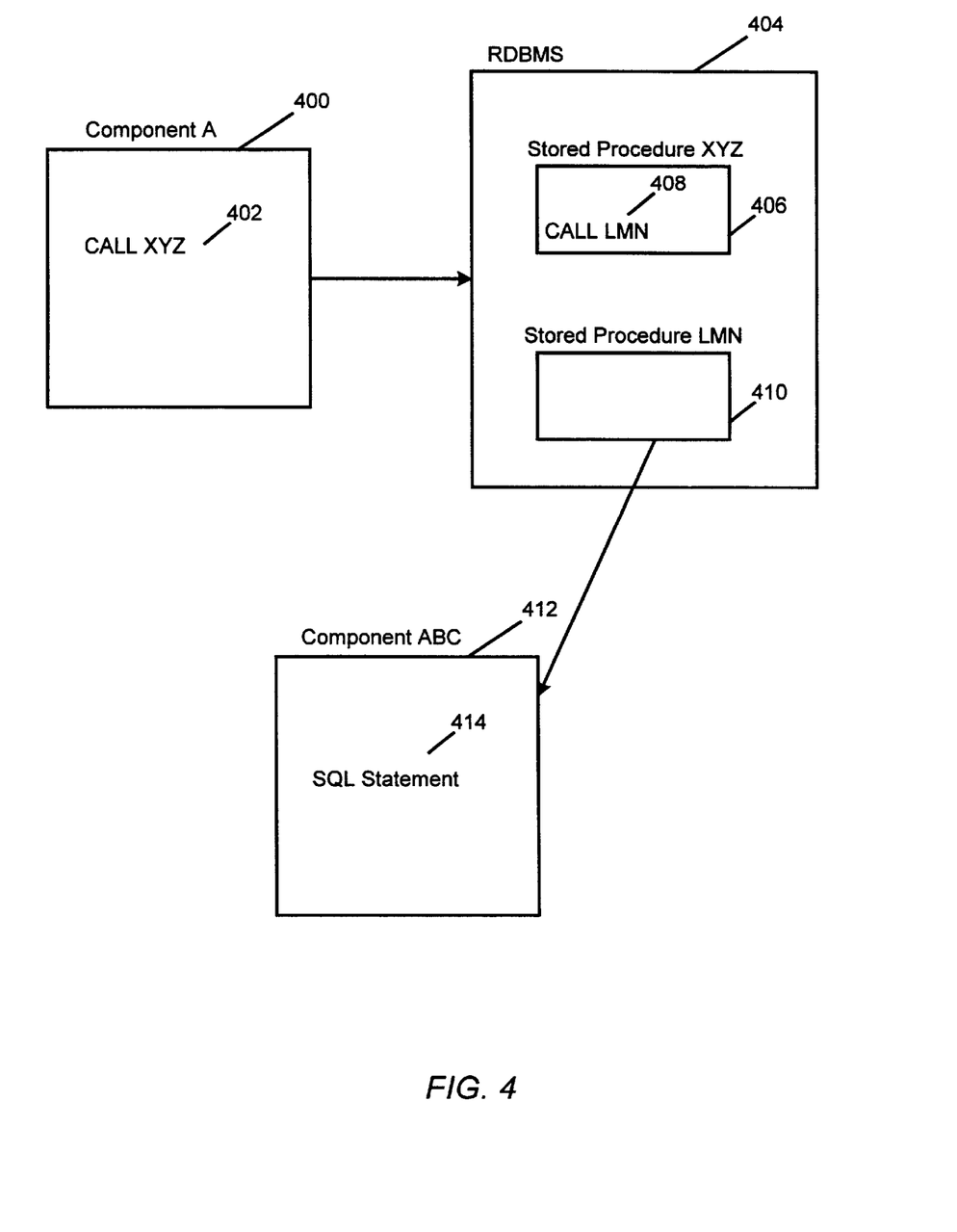
FIG. 4 is a block diagram illustrating an example using the present invention.
Figure 5A:
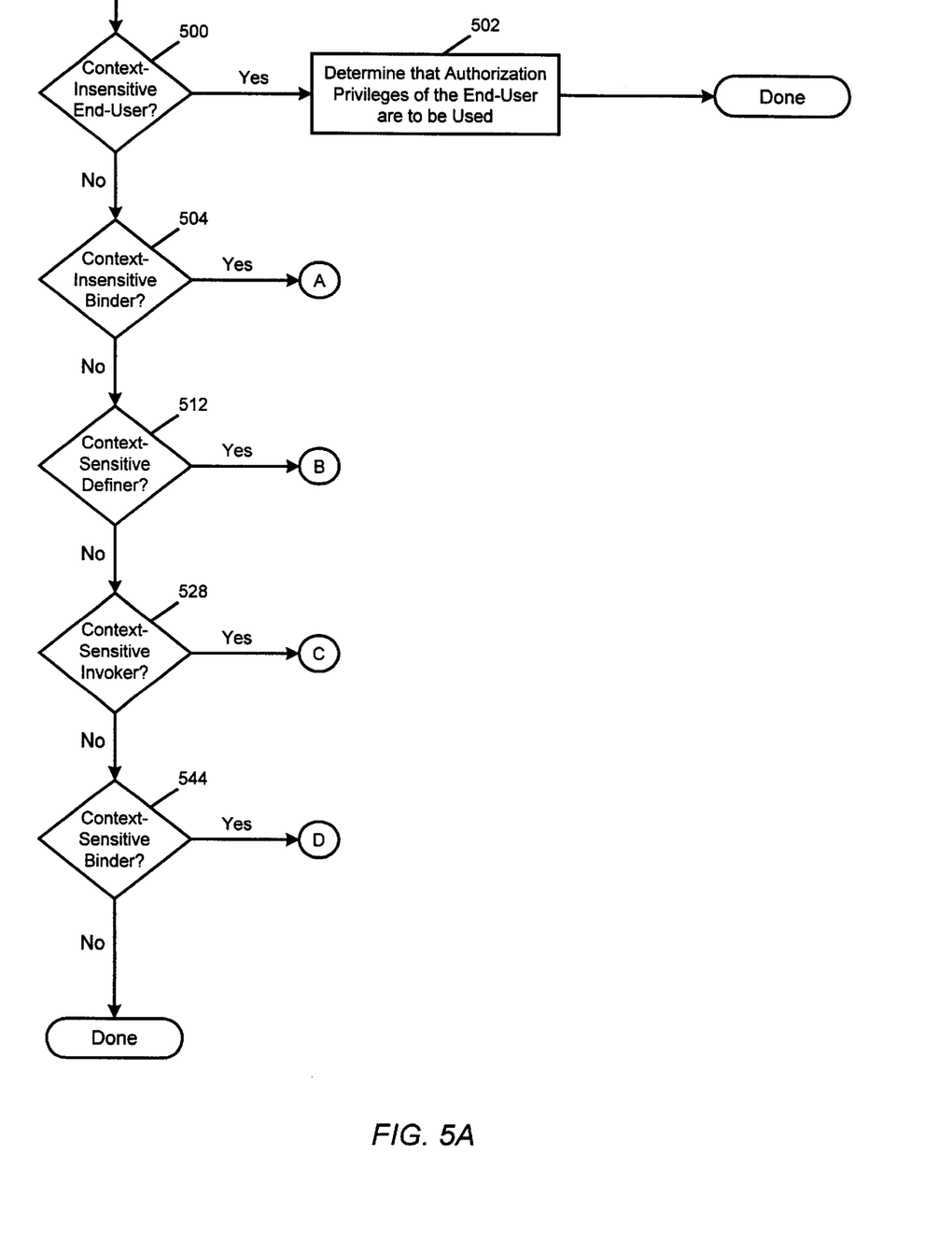
FIGS. 5A–5F are flow diagrams that illustrate the steps performed by the authorization system to identify authorization privileges.
Figure 5B:
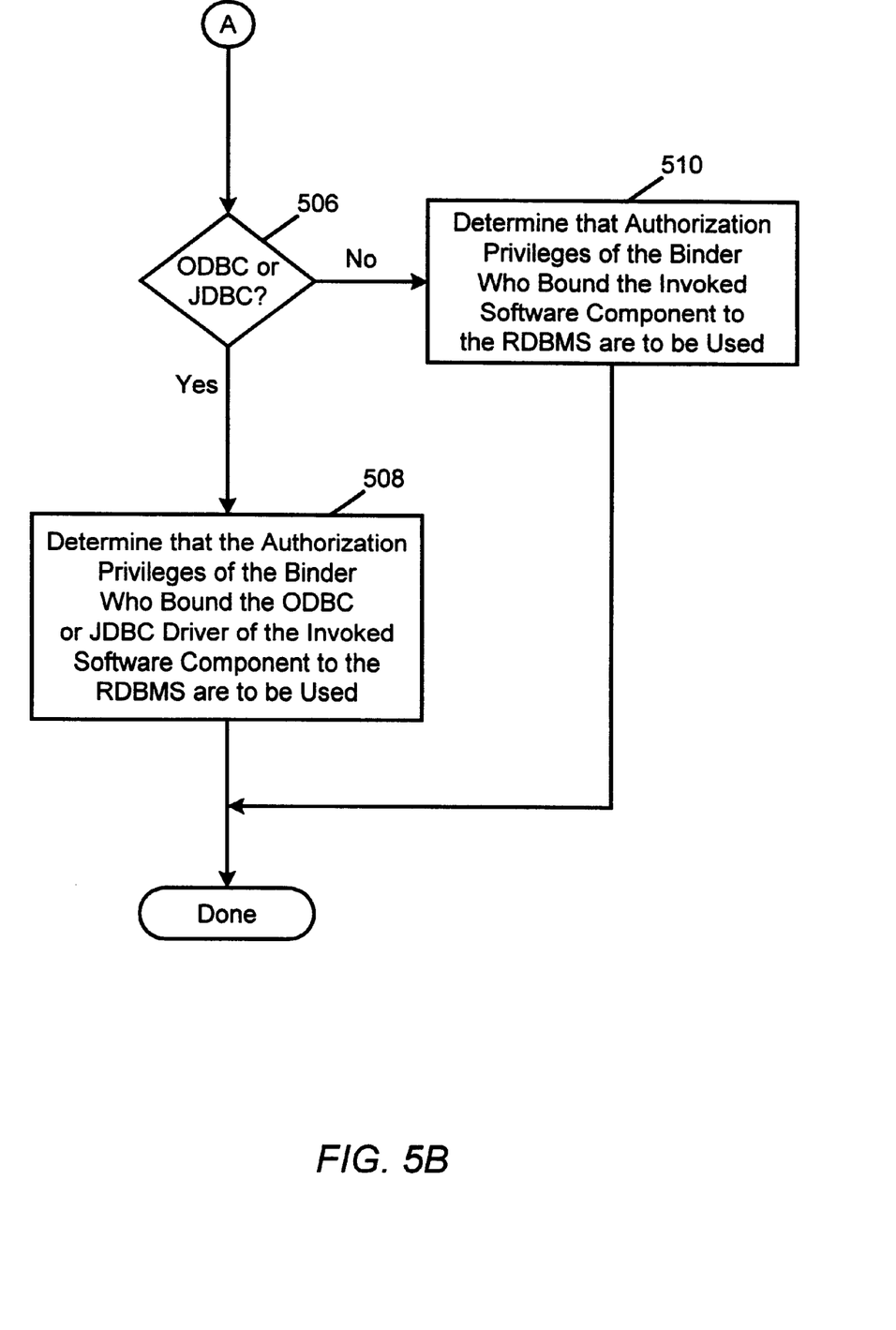
Figure 5C:
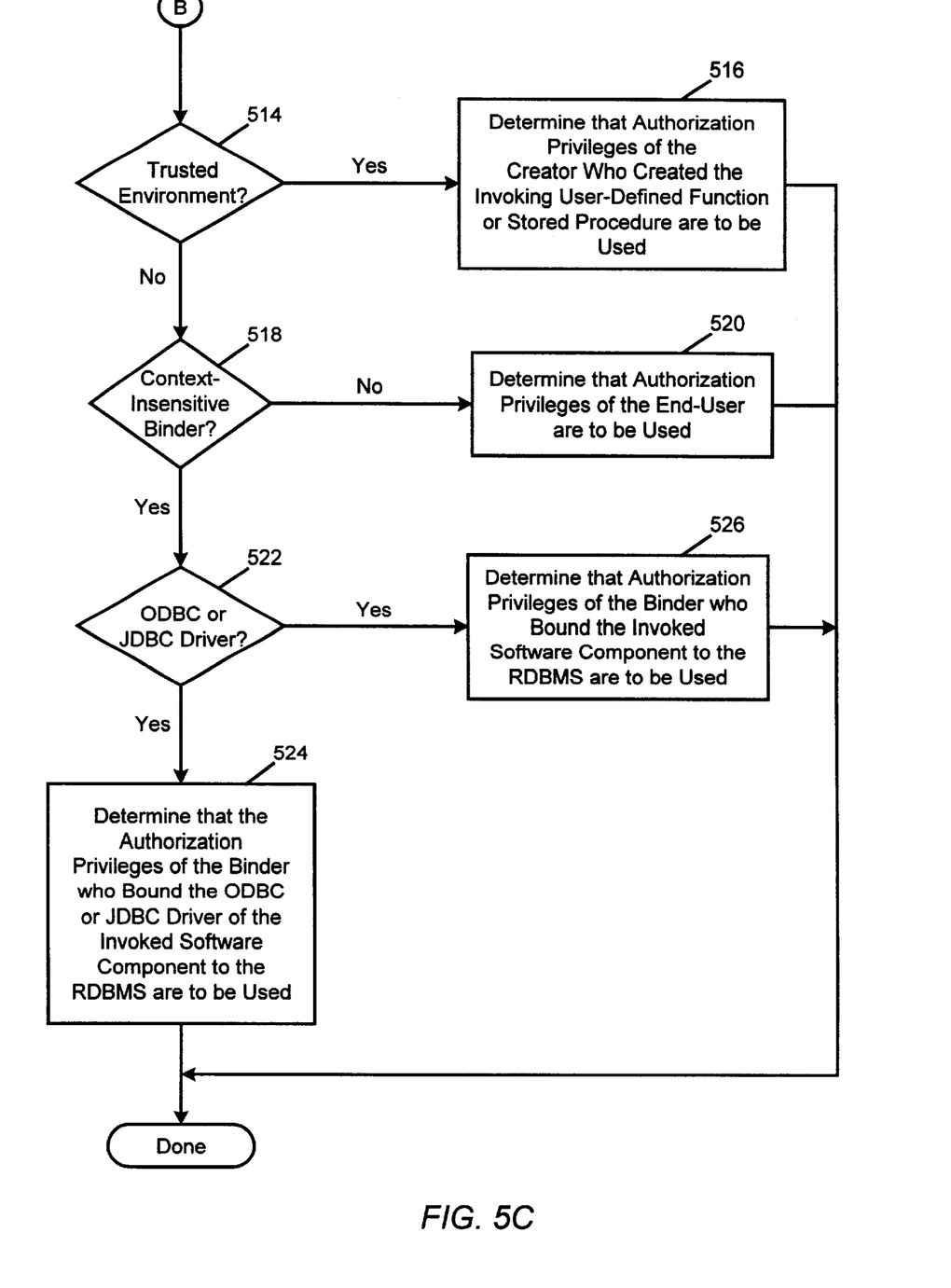
Figure 5D:
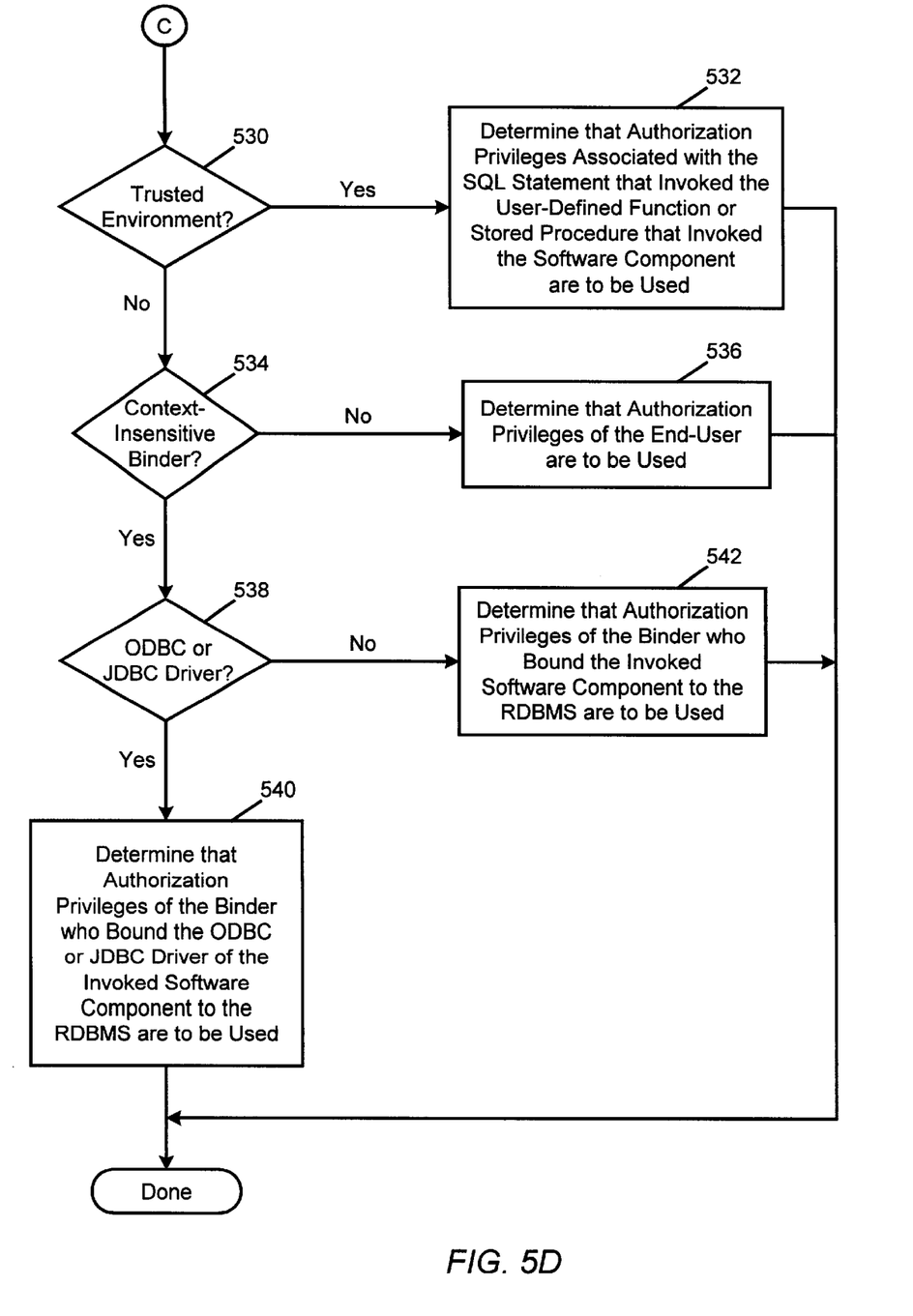
Figure 5E:
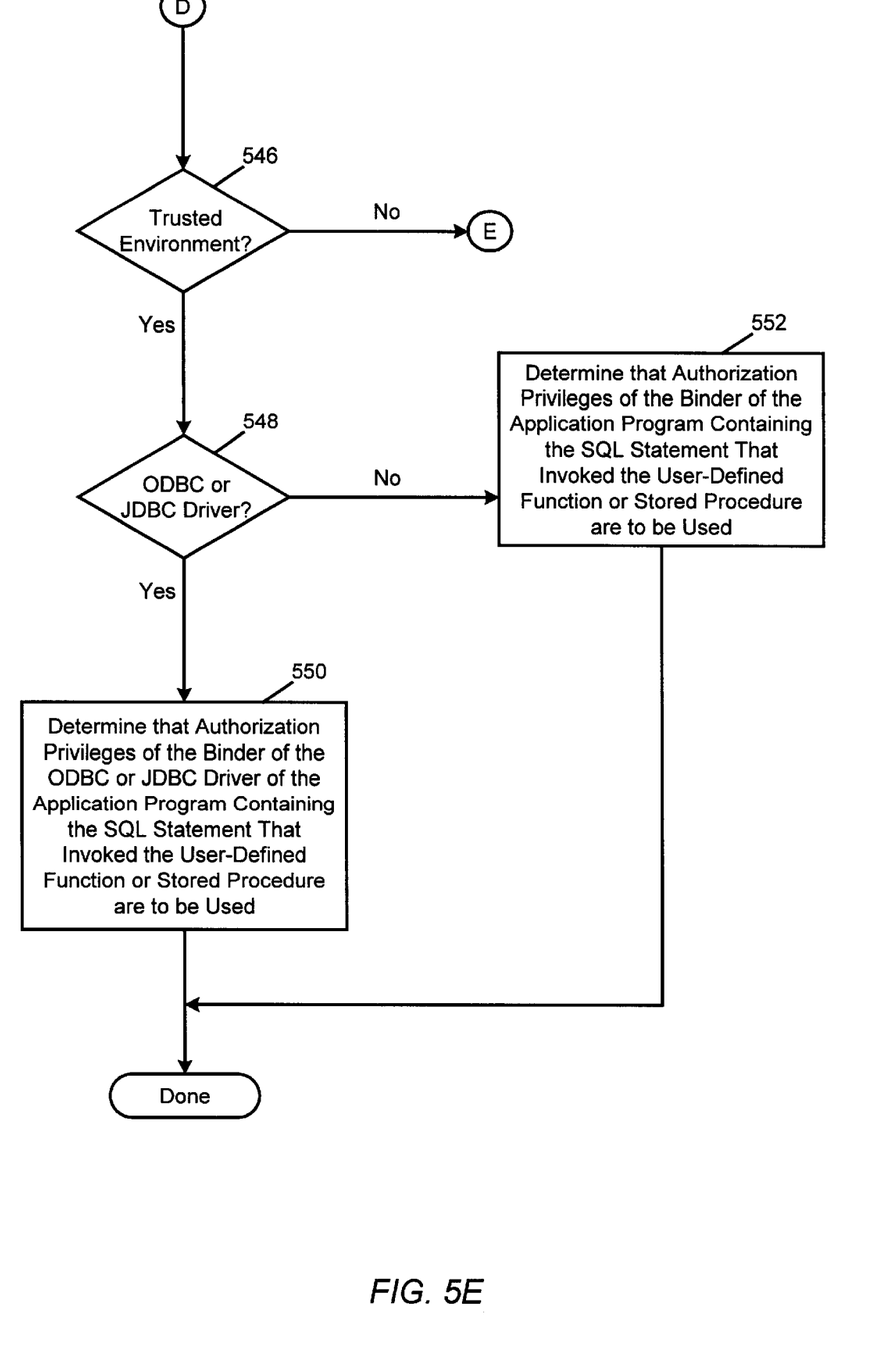
Figure 5F:
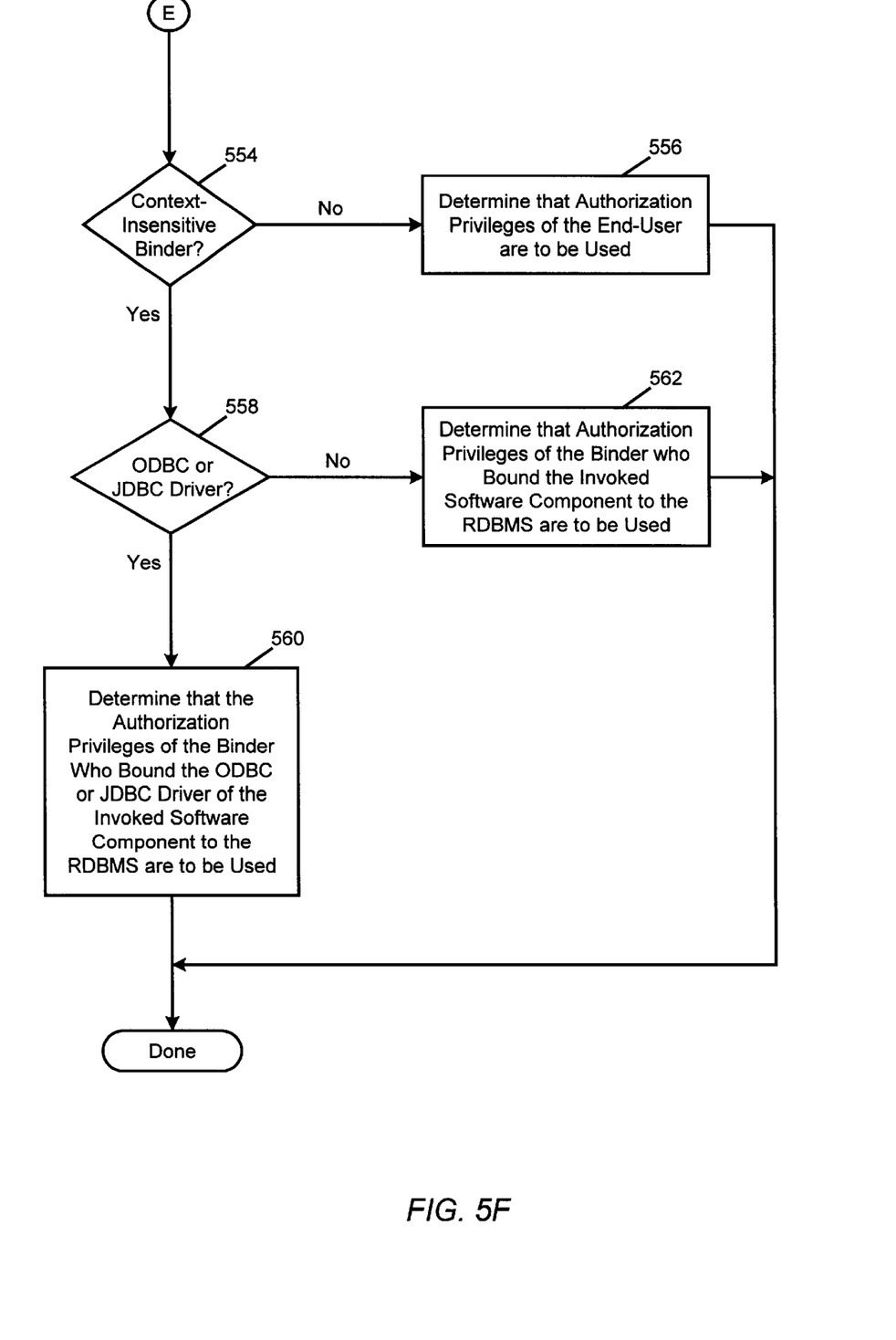

FIG. 4 is a block diagram illustrating an example using the present invention. Component A 400 accesses the RDBMS 404 directly. Component A 400 contains SQL statement 402, which invokes Stored Procedure XYZ 406. In turn, Stored Procedure XYZ 406 invokes Stored Procedure LMN 410 with SQL statement 408. Then, Stored Procedure LMN 410 invokes Component ABC 412. Because Component ABC 412 is invoked by a stored procedure, it is invoked in a trusted environment.

If the context-insensitive end-user security option were set, the authorization system 124 would perform the SQL statement 414 using the end-user's authorization privileges. If the context-insensitive binder security option were set, the authorization system 124 would perform the SQL statement 414 using the privileges associated with the authorization identifier of the person who bound Component ABC 412 to the RDBMS 404. (If Component ABC 412 accessed the RDBMS 404 using a generic interface, the authorization system 124 would use the privileges associated with the authorization identifier of the person who bound the generic interface to the RDBMS 404.)

If the context-sensitive definer security option were set, the authorization system 124 would perform the SQL statement 414 using the privileges associated with the authorization identifier of the creator of Stored Procedure LMN 410. If the context-sensitive invoker security option were set, the authorization system 124 would perform the SQL statement 414 using the authorization identifier associated with the SQL statement 408 that invoked the Stored Procedure LMN 410. The authorization privileges associated with the SQL Statement 408 depend upon the security option chosen for Stored Procedure XYZ 406, which invoked Stored Procedure LMN 410. If the context-sensitive binder security option were set, the authorization system 124 would perform the SQL statement 414 using the privileges associated with the authorization identifier of the person who bound Stored Procedure XYZ 406 to the RDBMS 404, because Stored Procedure XYZ 406 contains the SQL statement 408 that invokes Stored Procedure LMN 410.

FIGS. 5A–5F are flow diagrams that illustrate the steps performed by the authorization system 124 to identify authorization privileges. In Block 500, the authorization system 124 determines whether the context-insensitive end-user security option is set. If the context-insensitive end-user security option is set, the authorization system 124 continues to Block 502, otherwise, the authorization system 124 continues to Block 504. In Block 502, the authorization system 124 determines that the authorization privileges of the end-user are to be used.

In Block 504, the authorization system 124 determines whether the context-insensitive binder security option is set. If the context-insensitive binder security option is set, the authorization system 124 continues to Block 506, otherwise, the authorization system 124 continues to Block 512. In Block 506, the authorization system 124 determines whether an ODBC or a JDBC driver is being used. If an ODBC or JDBC driver is being used, the authorization system 124 continues to Block 508, otherwise, the authorization system 124 continues to Block 510. In Block 508, the authorization system 124 determines that the authorization privileges of the binder who bound the ODBC or JDBC driver of the invoked software component to the RDBMS are to be used. In Block 510, the authorization system 124 determines that the authorization privileges of the binder who bound the invoked software component to the RDBMS are to be used.

In Block 512, the authorization system 124 determines whether the contextsensitive definer security option is set. If the context-sensitive defmer security option is set, the authorization system 124 continues to Block 514, otherwise, the authorization system 124 continues to Block 528.

In Block 514, the authorization system 124 determines whether the context is a trusted environment. If the context is a trusted environment, the authorization system 124 continues to Block 516, otherwise, the authorization system 124 continues to Block 518. In Block 516, the authorization system 124 determines that the authorization privileges of the creator who created the invoking user-defined function or stored procedure are to be used.

For untrusted environments, the authorization system 124 determines whether the user has selected the context-insensitive binder security option or the context-insensitive end-user security option. In particular, in Block 518, the authorization system determines whether the context-insensitive binder security option is set. If the context-insensitive binder security option is set, the authorization system 124 continues to Block 520, otherwise, the authorization system 124 continues to Block 522. In Block 520, the authorization system 124 determines that authorization privileges of the end-user are to be used. In Block 522, the authorization system 124 determines whether an ODBC or a JDBC driver is being used. If an ODBC or JDBC driver is being used, the authorization system 124 continues to Block 524, otherwise, the authorization system 124 continues to Block 526. In Block 524, the authorization system 124 determines that the authorization privileges of the binder who bound the ODBC or JDBC driver of the invoked software component to the RDBMS are to be used. In Block 526, the authorization system 124 determines that the authorization privileges of the binder who bound the invoked software component to the RDBMS are to be used.

In Block 528, the authorization system 124 determines whether the contextsensitive invoker security option is set. If the context-sensitive invoker security option is set, the authorization system 124 continues to Block 530, otherwise, the authorization system 124 continues to Block 544.

In Block 530, the authorization system 124 determines whether the context is a trusted environment. If the context is a trusted environment, the authorization system 124 continues to Block 532, otherwise, the authorization system 124 continues to Block 534. In Block 532, the authorization system 124 determines that the authorization privileges associated with the SQL statement that invoked the user-defined function or stored procedure that invoked the software component are to be used.

For an untrusted environment, in Block 534, the authorization system determines whether the context-insensitive binder security option is set. If the context-insensitive binder security option is set, the authorization system 124 continues to Block 538, otherwise, the authorization system 124 continues to Block 536. In Block 536, the authorization system 124 determines that authorization privileges of the end-user are to be used. In Block 538, the authorization system 124 determines whether an ODBC or a JDBC driver is being used. If an ODBC or JDBC driver is being used, the authorization system 124 continues to Block 540, otherwise, the authorization system 124 continues to Block 542. In Block 540, the authorization system 124 determines that the authorization privileges of the binder who bound the ODBC or JDBC driver of the invoked software component to the RDBMS are to be used. In Block 542, the authorization system 124 determines that the authorization privileges of the binder who bound the invoked software component to the RDBMS are to be used.

In Block 544, the authorization system 124 determines whether the context-sensitive binder security option is set. If the context-sensitive binder security option is set, the authorization system 124 continues to Block 546, otherwise, the authorization system 124 is done.

In Block 546, the authorization system 124 determines whether the context is a trusted environment. If the context is a trusted environment, the authorization system 124 continues to Block 548, otherwise, the authorization system 124 continues to Block 554. In Block 548, the authorization system 124 determines whether an ODBC or JDBC driver is being used. If an ODBC or JDBC driver is being used, the authorization system 124 continues to Block 550, otherwise, the authorization system 124 continues to Block 552. In Block 550, the authorization system 124 determines that the authorization privileges of the binder who bound the ODBC or JDBC driver of the application program containing the SQL statement that invoked the user-defined function or stored procedure are to be used. In Block 542, the authorization system 124 determines that the authorization privileges of the binder who bound the application program containing the SQL statement that invoked the user-defined function or stored procedure are to be used.

For an untrusted environment, in Block 554, the authorization system determines whether the context-insensitive binder security option is set. If the context-insensitive binder security option is set, the authorization system 124 continues to Block 558, otherwise, the authorization system 124 continues to Block 556. In Block 556, the authorization system 124 determines that authorization privileges of the end-user are to be used. In Block 558, the authorization system 124 determines whether an ODBC or a JDBC driver is being used. If an ODBC or JDBC driver is being used, the authorization system 124 continues to Block 560, otherwise, the authorization system 124 continues to Block 562. In Block 560, the authorization system 124 determines that the authorization privileges of the binder who bound the ODBC or JDBC driver of the invoked software component to the RDBMS are to be used. In Block 562, the authorization system 124 determines that the authorization privileges of the binder who bound the invoked software component to the RDBMS are to be used.

Example Application of the Invention

The present invention is useful in many scenarios. The following is an example of one of these scenarios.

In this example, a company, XYZ, has a PAYROLL database containing sensitive company information. In particular, the PAYROLL database contains the salaries of all of the employees in the company. Additionally, a simple software component (e.g., a C++component) called EMP_SALARY can be used to access the PAYROLL database and return the salary of a specified employee.

The EMP_SALARY software component uses an ODBC driver to access the RDBMS, which means that the EMP_SALARY software component uses dynamic SQL to access the PAYROLL database. The EMP_SALARY software component is designed as a very low-level software component, which does not enforce any software component security. Instead, the EMP_SALARY software component relies on the RDBMS to determine whether a request to invoke the EMP_SALARY component is authorized.

Additionally, a userdefined function, MY_SALARY, is available. The MY_SALARY userdefined function allows every employee to look up their own salary in the PAYROLL database. The MY_SALARY user-defined function can be a short program that invokes the EMP_SALARY software component with the current end-user's user identification (e.g., USERID). The EMP_SALARY software component uses the user identification to scan the PAYROLL database for the end-user's salary. The following is psuedocode for a sample statement using the MY_SALARY user-defined function:

SELECT MY_SALARY( ) FROM SALARY_TABLE

Since company XYZ reuses software components, company XYZ would like to have the MY_SALARY user-defined function invoke the EMP_SALARY software component, rather than hard code a new PAYROLL query in the MY_SALARY user-defined function.

With existing RDBMS authorization rules, company XYZ cannot implement the MY_SALARY user-defined function without compromising the security of the PAYROLL database. In particular, if the EMP_SALARY software component uses the end-user's authorization for the dynamic PAYROLL query, the end-user would need authorization for SELECT privileges against the PAYROLL database. This is not acceptable, because each of the end-users will be able to issue SQL SELECT statements directly to the PAYROLL database, bypassing the MY_SALARY function.

On the other hand, if the EMP_SALARY software component uses the authorization privileges of the binder who bound the EMP_SALARY software component to the RDBMS, the EMP_SALARY software component, which uses ODBC, would have authorization privileges of the binder that bound the ODBC driver to the RDBMS. However, this authorization scheme would enable every end-user to have the authority to run the ODBC driver, so every end-user would be able to invoke the EMP_SALARY software component with any employee's USERID.

Under the present invention, new context-sensitive authorization rules are introduced that resolve the security issues.

For example, the ODBC driver can be bound to the RDBMS with the new security option that specifies that the context-sensitive DEFINER'S authorization privileges are to be used for PAYROLL database access.

When an application program outside the RDBMS calls the EMP_SALARY software component, the authorization system 124 will determine whether the context insensitive end-user security option or the context-insensitive binder security option are set. Assuming the context-insensitive binder security option is set, the authorization system 124 will use the authorization privileges of the binder who bound the ODBC driver of the EMP_SALARY software component to the RDBMS to search the PAYROLL database. If the binder has authorization to access the PAYROLL database, the authorization system 124 will recognize that the request from the EMP_SALARY software component for salary information is authorized and will return the requested salary information. An authorized binder could be, for example, a PAYROLL administrator. However, if the binder does not have authorization to access the PAYROLL database and tries to invoke the EMP_SALARY software component directly, the authorization system 124 will provide a security failure indication (e.g., an error message).

When the MY_SALARY user-defined function calls the EMP_SALARY software component, the authorization system 124 will recognize that the request is being issued in a secure environment (i.e., the RDBMS-managed environment used to run the user-defined function). In this case, the authorization system 124 uses the authorization privileges of the creator that created the MY_SALARY user-defined function to search the PAYROLL database. Assuming that the creator of the MY_SALARY user-defined function has the required authority, the authorization system will allow each of the end-user's to access the PAYROLL database under the control of the MY_SALARY function. However, the authorization system 124 will not allow these end-user's to access the PAYROLL database in any other fashion.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented authorization system 124. The present invention provides context-sensitive authorization in a database. The present invention also provides context-sensitive authorization with definer, invoker, and binder security options in a trusted environment. Moreover, the present invention enables users to select authorization privileges in untrusted environments.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a statement in a computer, the statement being executed by the computer to manipulate data in a database stored on a data storage device connected to the computer, the method comprising the steps of:

identifying an environment of the database from which the statement was invoked, wherein the environment comprises a trusted environment or an untrusted environment;

when the environment is the untrusted environments enabling a user to specify one or more authorization privileges; identifying a security option associated with the statement or with the user; and determining authorization privileges based on the identified environment and security option.

2. The method of claim 1, wherein the statement was invoked in a trusted environment.

3. The method of claim 2, wherein the security option is for a context-sensitive definer.

4. The method of claim 3, wherein one or more secure components are invoked while executing the statement and wherein the authorization privileges are those of a creator of a last invoked secure component.

5. The method of claim 2, wherein the security option is for a context-sensitive invoker.

6. The method of claim 5, wherein one or more secure components are invoked while executing the statement and wherein the authorization privileges are those associated with a statement invoking a last invoked secure component.

7. The method of claim 2, wherein the security option is for a context-sensitive binder.

8. The method of claim 7, wherein one or more secure components are invoked while executing the statement and wherein the authorization privileges are those associated with a component that invoked a last secure component.

9. The method of claim 1, wherein the environment is an untrusted environment.

10. The method of claim 9, further comprising the step of determining that the security option is for a context-insensitive user.

11. The method of claim 10, wherein the authorization privileges are those of an end-user.

12. The method of claim 9, further comprising the step of determining that the security option is for a context-insensitive binder.

13. The method of claim 12, wherein the authorization privileges are those of binder who bound an invoked unsecure component to the database.

14. The method of claim 13, wherein the invoked unsecure component uses a driver to access the database and wherein the authorization privileges are those of a binder who bound the driver to the database.

15. An apparatus for executing a statement, comprising:

a computer having a data storage device connected thereto, wherein the data storage device stores a database and wherein the statement is executed by the computer to manipulate data in the database;

one or more computer programs, performed by the computer, for identifying an environment of the database from which the statement was invoked, wherein the environment comprises a trusted environment or an untrusted environment, when the environment is the untrusted environment enabling a user to specify one or more authorization privileges identifying a security option associated with the statement or with the user, and determining authorization privileges based on the identified environment and security option.

16. The apparatus of claim 15, wherein the statement was invoked in a trusted environment.

17. The apparatus of claim 16, wherein the security option is for a context-sensitive definer.

18. The apparatus of claim 17, wherein one or more secure components are invoked while executing the statement and wherein the authorization privileges are those of a creator of a last invoked secure component.

19. The apparatus of claim 16, wherein the security option is for a context-sensitive invoker.

20. The apparatus of claim 19, wherein one or more secure components are invoked while executing the statement and wherein the authorization privileges are those associated with a statement invoking a last invoked secure component.

21. The apparatus of claim 16, wherein the security option is for a context-sensitive binder.

22. The apparatus of claim 21, wherein one or more secure components are invoked while executing the statement and wherein the authorization privileges are those associated with a component that invoked a last secure component.

23. The apparatus of claim 15, wherein the environment is an untrusted environment.

24. The apparatus of claim 23, further comprising the means for determining that the security option is for a context-insensitive user.

25. The apparatus of claim 24, wherein the authorization privileges are those of an end-user.

26. The apparatus of claim 23, further comprising the means for determining that the security option is for a context-insensitive binder.

27. The apparatus of claim 26, wherein the authorization privileges are those of a binder who bound an invoked unsecure component to the database.

28. The apparatus of claim 27, wherein the invoked unsecure component uses a driver to access the database and wherein the authorization privileges are those of a binder who bound the driver to the database.

29. An article of manufacture comprising a computer program carrier readable by a computer and embodying one or more instructions executable by the computer to perform method steps for executing a statement, the statement being performed by the computer to manipulate data in a database stored on a data storage device connected to the computer, the method comprising the steps of:

identifying an environment of the database from which the statement was invoked, wherein the environment comprises a trusted environment or an untrusted environment;

when the environment is the untrusted environment, enabling a user to specify one or more authorization privileges; identifying a security option associated with the statement or with the user; and determining authorization privileges based on the identified environment and security option.

30. The article of manufacture of claim 29, wherein the statement was invoked in a trusted environment.

31. The article of manufacture of claim 30, wherein the security option is for a context-sensitive definer.

32. The article of manufacture of claim 31, wherein one or more secure components are invoked while executing the statement and wherein the authorization privileges are those of a creator of a last invoked secure component.

33. The article of manufacture of claim 30, wherein the security option is for a context-sensitive invoker.

34. The article of manufacture of claim 33, wherein one or more secure components are invoked while executing the statement and wherein the authorization privileges are those associated with a statement invoking a last invoked secure component.

35. The article of manufacture of claim 30, wherein the security option is for a context-sensitive binder.

36. The article of manufacture of claim 35, wherein one or more secure components are invoked while executing the statement and wherein the authorization privileges are those associated with a component that invoked a last secure component.

37. The article of manufacture of claim 29, wherein the environment is an untrusted environment.

38. The article of manufacture of claim 37, further comprising the step of determining that the security option is for a context-insensitive user.

39. The article of manufacture of claim 38, wherein the authorization privileges are those of an end-user.

40. The article of manufacture of claim 37, further comprising the step of determining that the security option is for a context-insensitive binder.

41. The article of manufacture of claim 40, wherein the authorization privileges are those of a binder who bound an invoked unsecure component to the database.

42. The article of manufacture of claim 41, wherein the invoked unsecure component uses a driver to access the database and wherein the authorization privileges are those of a binder who bound the driver to the database.

* * * * *